United States Patent
Prasad

(10) Patent No.: US 7,487,411 B2
(45) Date of Patent: Feb. 3, 2009

(54) MULTI SYMBOL BIT DETECTION FOR SDPSK SIGNALS

(76) Inventor: Rakesh Prasad, House No.10, 4th Cross, HMT I Main Road, Subedarpalya, Yeshwanthpur, Bangalore, Karnataka (IN) 560022

( * ) Notice: Subject to any disclaimer, the term of this patent is extended or adjusted under 35 U.S.C. 154(b) by 379 days.

(21) Appl. No.: 11/478,271

(22) Filed: Jun. 29, 2006

(65) Prior Publication Data

US 2007/0118785 A1    May 24, 2007

(30) Foreign Application Priority Data

Nov. 11, 2005  (IN)  .......................... 1646/CHE/2005

(51) Int. Cl.
*H03M 13/00* (2006.01)
(52) U.S. Cl. ........................................ 714/709; 375/330
(58) Field of Classification Search ................. 375/322, 375/329, 330; 455/63.1; 714/701, 746, 709
See application file for complete search history.

(56) References Cited

U.S. PATENT DOCUMENTS

| 6,393,599 | B1 | 5/2002 | Chan | |
|---|---|---|---|---|
| 6,983,029 | B2 * | 1/2006 | Alavi et al. | 375/329 |
| 7,065,158 | B2 * | 6/2006 | Awater et al. | 375/322 |
| 7,191,385 | B2 * | 3/2007 | Olaker | 714/780 |
| 7,305,213 | B2 * | 12/2007 | Kasami et al. | 455/63.1 |

FOREIGN PATENT DOCUMENTS

| EP | 1 067 742 A2 | 1/2001 |
|---|---|---|
| EP | 1 128 624 A2 | 8/2001 |

* cited by examiner

*Primary Examiner*—David Ton
(74) *Attorney, Agent, or Firm*—Ash Tankha

(57) ABSTRACT

This invention discloses a method of accurately detecting the current bit in a SDPSK modulated signal at the receiver. The proposed method calculates the current bit from the past-detected bits and the past symbols. Each past symbol estimates the current bit. Each of these estimates is summed up to provide the final estimate of the bit. The proposed method for the reception of SDPSK modulated data improves the bit error rate performance. The proposed method can be applied in any communication system that uses SDPSK modulation.

1 Claim, 3 Drawing Sheets

MULTI SYMBOL BIT DETECTION FOR SDPSK SIGNALS

BACKGROUND OF THE INVENTION

The proposed invention, in general, relates to the demodulation of a symmetrical differential phase shift keying (SDPSK) modulated signal, and specifically relates to an improved method of bit error rate (BER) detection in a SDPSK modulated signal.

The method disclosed in this invention is a technique of improving the BER for the detection of SDPSK modulated signals. The current methods in the art do not yield accurate measurements of BER in SDPSK modulated systems. The method disclosed in this invention gives the same BER at a reduced signal to noise ratio (SNR). The method of improving the detection of SDPSK modulated signals, disclosed herein, can be applied to any communication system using SDPSK modulation.

In the current art for BER estimation in SDPSK modulated signals, the immediate previous bit is used to detect the current bit.

SUMMARY OF THE INVENTION

The proposed invention discloses a method for accurately detecting the current bit in a SDPSK modulated signal at the receiver. The proposed method calculates the current bit from the past-detected bits and the past symbols. Each past symbol estimates the current bit. Each of these estimates is summed up to provide the final estimate of the current bit.

The proposed method for the detection of SDPSK modulated bits improves the bit error rate performance. For example, if the system has a bit error rate of 0.01 at a signal to noise ratio (SNR) of say 6 dB, then the proposed method will achieve a bit error rate of 0.01 at a SNR of 5.4 dB.

One advantage of the proposed method is the improvement in bit error rate (BER) performance.

Another advantage of the proposed method is that, it can be applied to any communication system that uses SDPSK modulation.

DETAILED DESCRIPTION OF THE INVENTION

Figure 1A:
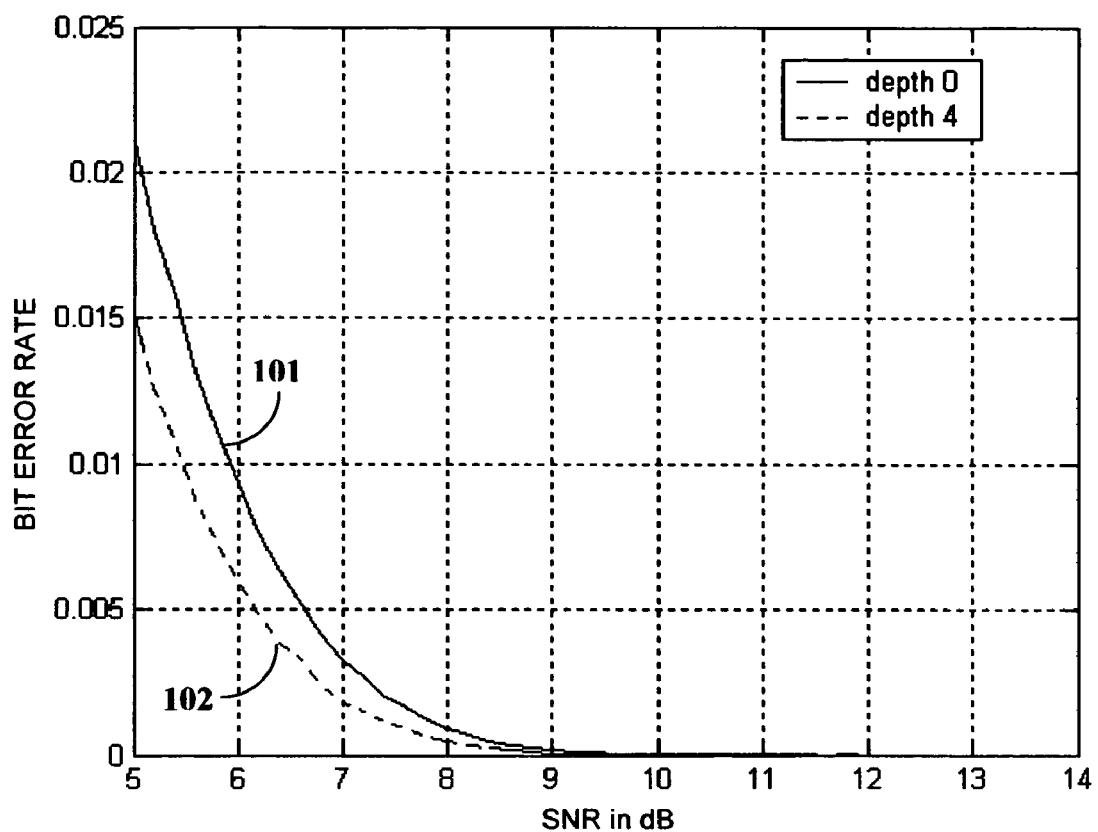
FIG. 1A illustrates the graphical representation of bit error rate versus signal to noise ratio at depth 4 and depth 0.

The method used in this invention considers all previous symbols and bits for the estimation of a current bit in the detection of the symmetrical differential phase shift keying (SDPSK) modulated signal.

The SDPSK modulation scheme is represented by the equation:

$$S_n = S_{n-1} * e^{(j*\Pi*b_n/2)}$$

where $S_n$ is the current modulated symbol
$S_{n-1}$ is the previous modulated symbol
$b_n$ is the current bit ($b_n=1$ for bit 1, $b_n=-1$ for bit 0)
where $j=\sqrt{-1}$ and $\Pi$ is a transcendental number, equal to approximately 3.142 . . .

The equations listed below substitute $S_{n-1}$ for four recursive expressions. By way of example, only four recursive expressions are shown to explain this invention. In actual practice, any number of recursive expressions can be used. Larger the number of recursive expressions used, greater is the improvement in BER performance.

$$S_n = S_{n-1} * e^{(j*\Pi*b_n/2)}$$

$$S_n = S_{n-2} * e^{(j*\Pi*b_n/2)} * e^{(j*\Pi*b_{n-1}/2)}$$

$$S_n = S_{n-3} * e^{(j*\Pi*b_n/2)} * e^{(j*\Pi*b_{n-1}/2)} * e^{(j*\Pi*b_{n-2}/2)}$$

$$S_n = S_{n-4} * e^{(j*\Pi*b_n/2)} * e^{(j*\Pi*b_{n-1}/2)} * e^{(j*\Pi*b_{n-2}/2)} * e^{(j*\Pi*b_{n-3}/2)}$$

Similarly, $S_n$ can be derived as a function of any of the previous bits. The following four equations are derived from the above four equations respectively.

$$e^{(j*\Pi*b_n/2)} = S_n * \mathrm{conj}(S_{n-1}) \quad (a)$$

$$e^{(j*\Pi*b_n/2)} = S_n * \mathrm{conj}(S_{n-2}) * e^{(j*\Pi*b_{n-1}/2)} \quad (b)$$

$$e^{(j*\Pi*b_n/2)} = S_n * \mathrm{conj}(S_{n-3}) * e^{(j*\Pi*b_{n-1}/2)} * e^{(j*\Pi*b_{n-2}/2)} \quad (c)$$

$$e^{(j*\Pi*b_n/2)} = S_n * \mathrm{conj}(S_{n-r}) * e^{(j*\Pi*b_{n-1}/2)} * e^{(j*\Pi*b_{n-2}/2)} * e^{(j*\Pi*b_{n-(r-1)}/2)} \quad (d)$$

Applying Eulers theorem to the equation $e^{(j*\Pi*b_n/2)} = S_n * \mathrm{conj}(S_{n-1})$, we derive:

$$\mathrm{Cos}(\Pi/2.b_n) + j\,\mathrm{Sin}(\Pi/2.b_n) = S_n * \mathrm{conj}(S_{n-1})$$

Applying Eulers theorem and summing the left hand side and right hand side of equations (a), (b), (c) and (d), $$(\mathrm{Cos}(\Pi/2.b_n) + j\,\mathrm{Sin}(\Pi/2.b_n)) * r = S_n * \mathrm{conj}(S_{n-1}) + S_n * \mathrm{conj}(S_{n-2}) * e^{(j*\Pi*b_{n-1}/2)} + \ldots + S_n * \mathrm{conj}(S_{n-2}) * e^{(j*\Pi*b_{n-(r-1)}/2)}) \quad (e)$$

$b_n$ can assume only one of the two values, viz. −1 or +1.

Therefore, for $b_n=1$, $\mathrm{Cos}(\Pi/2.b_n)=0$ and $\mathrm{Sin}(\Pi/2\,b_n)=r$ and for $b_n=-1$, $\mathrm{Cos}(\Pi/2.b_n)=0$ and $\mathrm{Sin}(\Pi/2\,b_n)=-r$ The imaginary part on the left side should be equal to the imaginary part on the right side of equation (e), while the real part on the left side should be equal to the real part on the right side.

Sign of the imaginary part on the left side should be equal to the sign of the imaginary part on the right side of the equation (e).

Hence, bn is given by the sign of the imaginary part on the right hand side of equation (2)

$$b_n = \mathrm{sign}(\mathrm{imag}(S_n * \mathrm{conj}(S_{n-1}) + \ldots + S_n * \mathrm{conj}(S_{n-(r-1)})))$$

It can be observed from the above equations that multiple estimates for $b_n$ can be derived. The sum of all the above estimates provides an accurate assessment of the current bit $b_n$, represented by the following equation:

$$b_{n\_estimated} = [S_n * \mathrm{conj}(S_{n-1}) + S_n * \mathrm{conj}(S_{n-2}) * e^{(j*\Pi*b_{n-1}/2)} + S_n * \mathrm{conj}(S_{n-3}) * e^{(j*\Pi*b_{n-1}/2)} * e^{(j*\Pi*b_{n-2}/2)} + S_n * \mathrm{conj}(S_{n-4}) * e^{(j*\Pi*b_{n-1}/2)} * e^{(j*\Pi*b_{n-2}/2)} * e^{(j*\Pi*b_{n-3}/2)}]$$

The current bit is calculated by the formula:

$$Bit = \text{sign}(\text{imag}(b_{n\_estimated}))$$

wherein, sign(x)=1 if x>0 and sign(x)=−1 if x<0 imag(x) is the imaginary part of the complex number x.

FIG. 1A illustrates the graphical representation of bit error rate versus signal to noise ratio in depth 4 by implementing the method presented in this invention. Depth is the number of past bits that are used to estimate the current bit. From the graph, it is found that the plots for depth 0 101 and depth 4 102 at an SNR of 6 dB, the bit error rates are approximately 0.009 and 0.006 respectively.

Figure 1B:
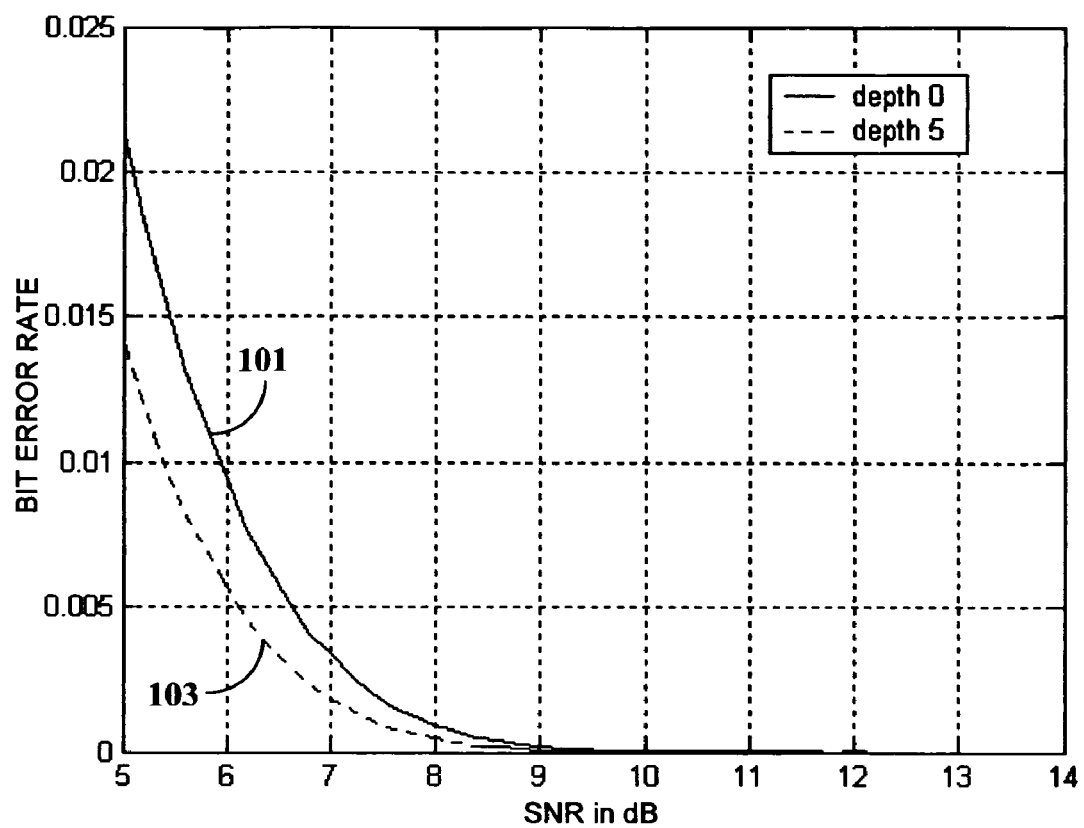
FIG. 1B illustrates the graphical representation of bit error rate versus signal to noise ratio at depth 5 and depth 0.

FIG. 1B illustrates the graphical representation of bit error rate versus signal to noise ratio in depth 5 by implementing the method presented in this invention. From the graph, it is found that the plots for depth 0 101 and depth 5 103 at an SNR of 6 dB, the bit error rates are approximately 0.009 and 0.0055 respectively.

Figure 1C:
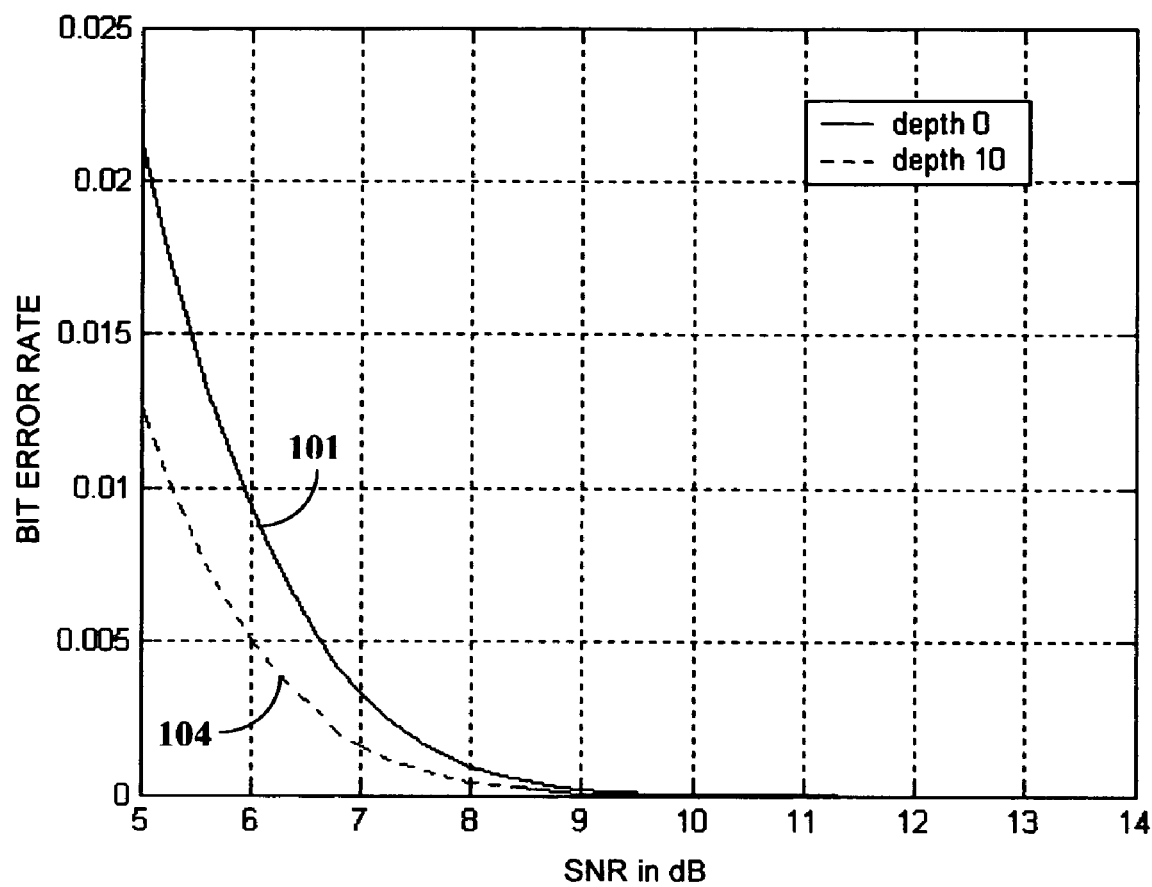
FIG. 1C illustrates the graphical representation of bit error rate versus signal to noise ratio at depth 10 and depth 0.

FIG. 1C illustrates the graphical representation of bit error rate versus signal to noise ratio in depth 10 by implementing the method presented in this invention. From the graph, it is found that the plots for depth 0 101 and depth 10 104 at an SNR of 6 dB, the bit error rates are approximately 0.009 and 0.005 respectively.

It is observed from FIG. 1A, FIG. 1B and FIG. 1C that as the depth increases, i.e., as the number of past bits used in BER estimation is increased, the BER performance improves progressively.

The invention claimed is:

1. A method of detecting the current bit in a symmetrical differential phase shift keying modulated signal, comprising the steps of:

calculating said current bit symbol $S_n$ using the recursive expression $$S_n = S_{n-r} * e^{(j*\Pi*bn/2)} * e^{((j*\Pi*bn-1)/2)} \ldots e^{(j*\Pi*bn-(r-1)/2)}$$

$$e^{(j*\Pi*bn/2)} = S_n * \text{conj}(S_{n-r}) * e^{(j*\Pi*bn-1/2)} * e^{(j*\Pi*bn-2/2)} * \ldots * e^{(j*\Pi*bn-(r-1)/2)}$$

wherein r is the number of past bits used for the detection of the current bit, $S_{n-r}$ is the $r^{th}$ past symbol, $b_n$ is the current bit and $S_n$ is the current symbol and n is the sequence index, j is the square root of −1;

calculating the summation of all the r estimated bits using the equation $$b_{n\_estimated} = [S_n * \text{conj}(S_{n-1}) + S_n * \text{conj}(S_{n-2}) * e^{(j*\Pi*bn-1/2)} + S_n * \text{conj}(S_{n-3}) * e^{(j*\Pi*bn-1/2)} * e^{(j*\Pi*bn-2/2)} + \ldots + S_n * \text{conj}(S_{n-r}) * e^{(j*\Pi*bn-1/2)} * e^{(j*\Pi*bn-2/2)} * \ldots * e^{(j*\Pi*bn-3/2)}]$$

wherein $b_{n\_estimated}$ is the current estimated bit; and determining said current bit using the formula $$bit = \text{sign}(\text{imag}(b_{n\_estimated})).$$

\* \* \* \* \*